United States Patent

[11] 3,577,059

[72] Inventor Fred W. Kelley, Jr.
Media, Pa.
[21] Appl. No. 807,867
[22] Filed Mar. 17, 1969
[45] Patented May 4, 1971
[73] Assignee General Electric Company

[54] ELECTRIC POWER APPARATUS COMPRISING CONVERTER, FILTER, REGULATOR, AND MEANS FOR DYNAMICALLY STABILIZING THE FILTER
6 Claims, 4 Drawing Figs.

[52] U.S. Cl. .................................................. 321/10,
321/18, 323/20
[51] Int. Cl. ...................................................... H02m 1/14,
H02m 7/12
[50] Field of Search .......................................... 321/5, 10,
11, 14, 18, 19, 38, 40; 323/20

[56] References Cited
UNITED STATES PATENTS

| 2,663,839 | 12/1953 | Marshall | 321/10 |
| 3,403,318 | 9/1968 | Krauthamer et al. | 321/5 |
| 3,453,526 | 7/1969 | Bowles | 321/19 |
| 3,461,374 | 8/1969 | Rhyne | 321/14X |
| 3,467,848 | 9/1969 | Ainsworth | 321/14 |

Primary Examiner—William H. Beha, Jr.
Attorneys—J. Wesley Haubner, Albert S. Richardson, Jr., Frank L. Neuhauser, Oscar B. Waddell and Melvin M. Goldenberg ABSTRACT: In electric power apparatus including a voltage-regulated converter and a filter supplying a load circuit with relatively smooth unipolarity voltage of desired magnitude, the filter is stabilized by connecting rate feedback means to its output for deriving a negative feedback signal that dominates the dynamic response of the regulator to source or load disturbances.

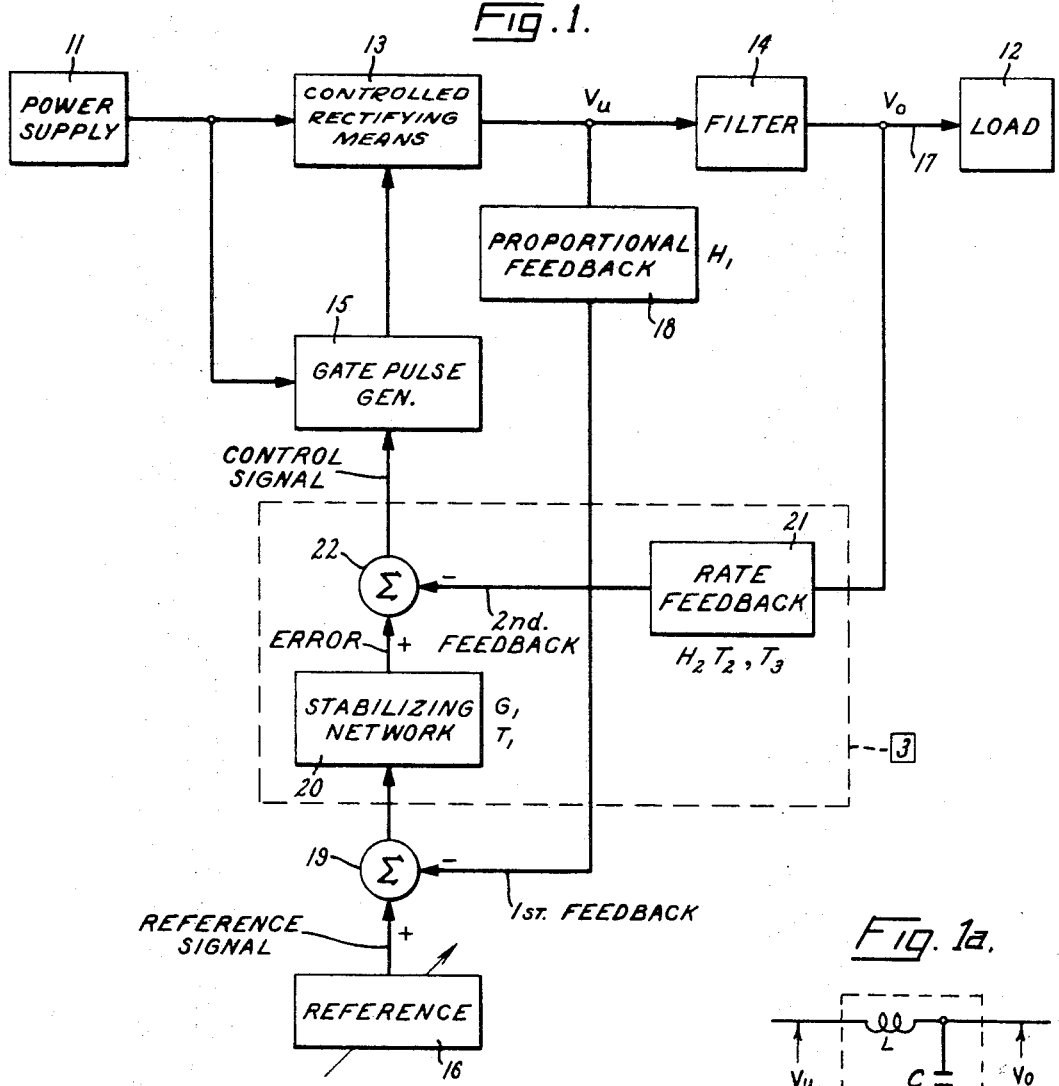
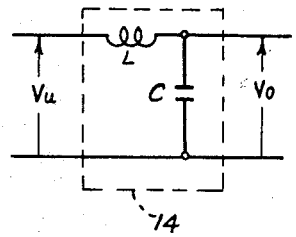
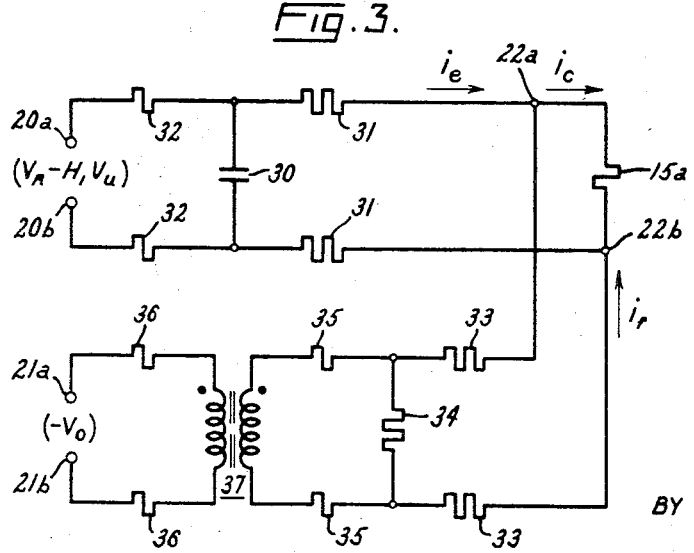

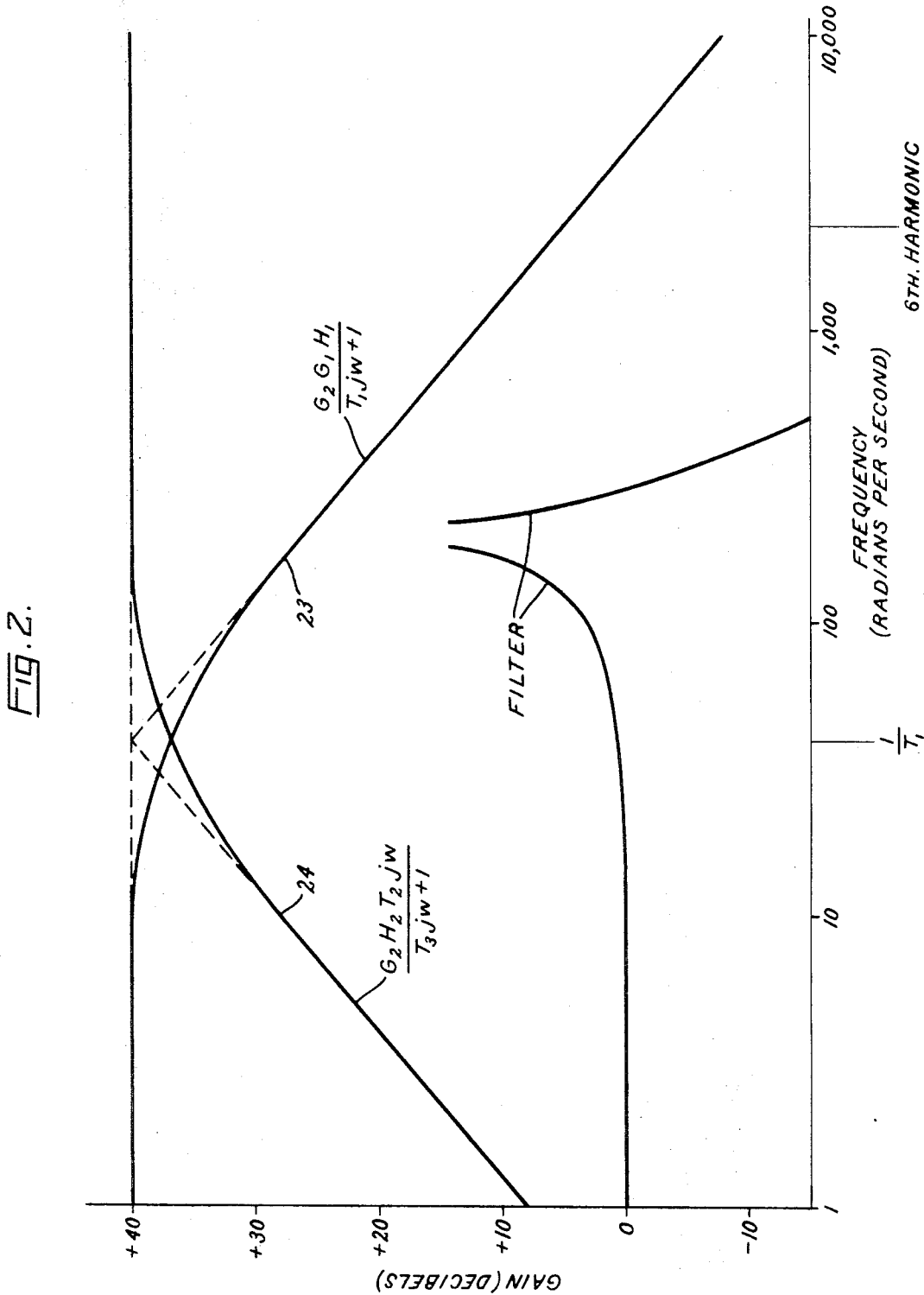

ELECTRIC POWER APPARATUS COMPRISING CONVERTER, FILTER, REGULATOR, AND MEANS FOR DYNAMICALLY STABILIZING THE FILTER

This invention relates to electric power conversion apparatus, and more particularly it relates to improved means for controlling the damping factor of such apparatus.

In the art of electric power conversion, it is common practice to change sinusoidal, 60-hertz alternating voltage of relatively constant magnitude (r.m.s.) to unipolarity voltage of controllable magnitude by means of solid-state electric valves known generally as controlled rectifiers and more popularly as SCR's or thyristors. A thyristor can be cyclically switched from a high-resistance turned off state to a low-resistance, forward conducting state by applying an appropriate trigger signal to its gate. For any given circuit configuration of thyristors (e.g., a 3-phase double-way 6-pulse rectifying bridge), the average magnitude of DC voltage delivered by the converter will be determined by the firing angle (alpha) of the trigger signals. This mode of voltage control is commonly referred to as "phase control" and is more fully explained in Chapter 8, pages 295—324 of a book published in 1964 and entitled SEMICONDUCTOR CONTROLLED RECTIFIERS by F. E. Gentry et al. (Prentice-Hall, Inc. Englewood Cliffs, N.J.). In order to vary or regulate voltage magnitude, such converters are conventionally equipped with suitable means for varying alpha as a function of a variable control signal which can be manually or automatically programmed and regulated as desired.

The DC voltage generated by a phase controlled power rectifier is inherently characterized by undulations known as "ripple." The fundamental frequency of the DC ripple is a multiple of the AC supply frequency (e.g., sixth harmonic for a 6-pulse bridge), and the amplitude of the ripple increases with increasing alpha. If the load circuit that is fed by the conversion apparatus requires relatively smooth DC voltage, it is necessary to attenuate this ripple by interposing a filter between the rectifying means and the load. The filter typically comprises a series choke and parallel capacitors whose parameters (L henrys and C farads, respectively) must be selected so that the resonant frequency of the filter is well below (e.g., less than one-tenth) that of the ripple frequency. This fixes the product of L and C. Since the per henry cost of chokes is significantly higher than the per farad cost of capacitors in high power conversion apparatus, it is economically advantageous to use the lowest possible ratio of L to C. But when this ratio is below a certain magnitude which is established by the full-load resistance of the load circuit, the system becomes underdamped.

The damping factor of a typical system of the type herein contemplated is in practice relatively small (e.g., 0.01). Consequently, the response of the filter output voltage to step changes of load or abrupt changes of the AC supply voltage tends to be oscillatory. The worst case is when the conversion apparatus is unloaded, since the addition of load resistance will have some damping effect on the system.

In order to suppress the effects of power disturbances in an underdamped system, it has heretofore been suggested to add a bleed resistor across the filter capacitor. But this solution is undesirable because it wastes power and therefore lowers efficiency. Another proposed solution can be found in U.S. Pat. No. 3,273,043-Clarke et al. which shows a rate feedback network connected to a voltage regulating loop in a manner that tends to stabilize the load error detector in the event of parasitic source fluctuations. But this scheme leaves unsolved the problem of obtaining critically damped response to step changes of load.

Accordingly, it is a general objective of my invention to provide improved means for stabilizing underdamped electric power conversion apparatus.

In carrying out my invention in one form, I use proportional feedback from the undulating voltage output of the rectifier in a dynamically stable regulating loop, and I superimpose thereon a rate feedback from the filter output. By designing the latter with a loop gain that dominates system behavior in response to power disturbances, dynamic stability of the filter is achieved. Preferably, parameters are selected to closely approach critical damping of the system without load, and consequently the system will be slightly overdamped when loaded.

My invention will be better understood and its various objects and advantages will be more fully appreciated from the following description taken in conjunction with the accompanying drawings in which:

FIG. 1 is a functional block diagram of an electric power system embodying my invention;

FIG. 1a is a simplified schematic circuit diagram of the filter shown in block form in FIG. 1;

FIG. 2 is a gain v. angular frequency graph of regulator circuits used in a preferred embodiment of the invention; and FIG. 3 is a schematic circuit diagram of the stabilizing network and rate feedback means shown in block form in FIG. 1.

Referring now to FIG. 1, a power supply 11 is shown connected to a load 12 by way of electric power conversion apparatus comprising a converter 13 in series with a filter 14. The supply block 11 represents any suitable source of electric power, such as 3-phase AC mains of commercial power frequency (e.g., 60 hertz) or, alternatively, an electric storage battery. The input for the converter 13 is derived from this source. The load block 12 represents any desired load circuit, such as a plurality of electric power inverters supplying alternating voltage of adjustable frequency to a bank of variable speed AC motors (not shown). It is assumed that the load requires energization by a relatively smooth unipolarity voltage ($V_o$) of either fixed or variable magnitude, and therefore the output of the converter 13 has been coupled to the load 12 via the filter 14.

The converter 13 comprises controlled rectifying means operative to energize the filter 14 with an undulating voltage ($V_u$) whose average magnitude depends on the timing of a family of periodic trigger signals which are cyclically supplied thereto by associated gate pulse generating means 15. The timing of the trigger signals and hence the magnitude of $V_u$ can be varied by varying the magnitude of control signal which is derived from a reference signal source 16 and which is supplied to amplifying means in the gate pulse generator block 15 as shown. This may be accomplished by a variety of different converters and gate pulse generators whose design details are well known to those skilled in the art, and a more detailed disclosure herein is believed nonessential for a proper understanding of my invention. By way of example, in one practical embodiment of the invention, the converter 13 comprised six controlled valves arranged in a conventional 3-phase double-way 6-pulse bridge configuration for rectifying sinusoidal 60-hertz power. As a possible alternative, the converter could comprise a diode bridge and controlled rectifying means appropriately connected and arranged to operate as a DC chopper (see pages 343—46 of SEMICONDUCTOR CONTROLLED RECTIFIERS, supra).

The filter 14 will appreciably reduce the ripple content of the undulating voltage $V_u$, whereby the DC bus 17 which links the power conversion apparatus to the load circuit is energized by a relatively smooth output voltage $V_o$. For this purpose as shown in FIG. 1a, typically comprises a series inductance element or choke of L henrys and parallel capacitance elements of C farads. In order to properly attenuate the DC ripple, the resonant frequency of the filter must be well below the fundamental ripple frequency. For example, if the fundamental angular velocity of the ripple were 2,262 radians per second, corresponding to the 6th harmonic of 60-hertz supply voltage, the values of L and C are preferably chosen so that their product is about 0.000025 which results in a resonant angular frequency ($\omega_N$) of about 200 radians per second. In the interest of economy, the ratio of L to C is kept as low as possible, and consequently in practice a system like the one illustrated herein will be underdamped.

The output voltage of the power conversion apparatus is regulated by control circuitry that will next be described. In accordance with my invention, two interdependent voltage regulating loops are used.

As can be seen in FIG. 1, a first or "proportional" loop is formed by the combination of proportional feedback means 18 connected to the filter input for deriving a "first feedback signal" from the undulating voltage $V_u$, summation means 19 for providing an error signal representing the magnitude difference between a reference or command signal (supplied by the variable source 16) and the first feedback signal, and stabilizing means 20 connected in either the error signal branch (as shown) or the feedback branch of the proportional loop. The amplifying and gate pulse generating means 15 and the converter 13 complete the first loop; note that the filter 14 is excluded. The proportional feedback means 18 may include an isolating transformer or the like, and the magnitude of its feedback signal will be directly proportional to the instantaneous magnitude of $V_u$. The reference character $H_1$ is used herein to identify the gain or transfer characteristic of this part of the circuit. The stabilizing means 20 is provided to attenuate the ripple content of the first feedback signal and to affect loop gain as a function of angular frequency in a sense that prevents the proportional loop from becoming dynamically unstable. For this purpose the stabilizing means preferably is a lag network, and its static gain and time constant have been identified by the reference characters $G_1$ and $T_1$, respectively. The lumped transfer characteristic of the remainder of the proportional loop (control signal amplifier, gate pulse generator, and converter) will be herein identified by the reference character $G_2$. The resulting transfer characteristic for the first or proportional voltage regulating loop can be expressed as follows:

$$\frac{G_2G_1H_1}{T_1j\omega+1}$$

As is shown in FIG. 1, the second or "rate" loop comprises the combination of rate feedback means 21 connected to the DC bus 17 for deriving a "second feedback signal" from the output voltage $V_o$, and summation means 22 for supplying the rectifying means with a control signal whose magnitude depends on the difference between the aforesaid error signal and the second feedback signal. The rate loop also includes the amplifying and gate pulse generating means 15, the converter 13, and the filter 14. The rate feedback means 21 may include an isolating transformer or the like, and the magnitude of its feedback signal will be substantially proportional to the time rate of change of $V_o$ for angular frequencies below its break frequency. The dynamic transfer characteristic of the rate feedback means is herein identified by the reference character $H_2 T_2$, and the time constant of this means is $T_3$. Neglecting the filter 14, the gain of the second or rate voltage regulating loop can be expressed as follows:

$$\frac{G_2H_2T_2j\omega}{T_3j\omega+1}$$

In accordance with my invention, the parameters of the above-described regulating loops are so selected that the loop gain of the rate loop dominates the loop gain of the proportional loop at frequencies in the vicinity of the natural resonant frequency of the filter 14. Consequently, the second feedback signal will override the error signal during abnormal or transient variations in the power supply or in the load, thereby causing compensating changes in $V_u$ and stabilizing the response of the filter 14 to such power disturbance. Preferably the parameters are chosen so that system response to no-load power disturbances is critically dampened. This is illustrated graphically in FIG. 2 where gain is plotted against angular frequency (log scale) for the assumed conditions of no load and negligible damping factor. (The latter assumption is justified because the damping factor of a typical converter-filter-regulator system is in practice relatively small, particularly when unloaded. For example, a series damping factor of 0.01 is not unusual.)

In FIG. 2 the loop gain of the proportional loop is shown by the line 23. Ordinarily the desired DC gain of this loop (i.e., $G_2G_1H_1$) is very much greater than one, and a gain of 100 (i.e., 40db.) has been assumed. This can be obtained by judiciously selecting $G_1$, since in practice $G_2$ and $H_1$ are usually fixed by the mechanism of the converter and the proportional feedback circuit, respectively. To ensure critical damping of the system under no load conditions, I select a value of $T_1$ whose reciprocal is appreciably less than $\omega_N$, and I let $T_3$ equal $T_1$. Preferably $$T_1 = \frac{(G_2G_1H_1)^{\frac{1}{2}}}{2\omega_N}$$

Assuming $\omega_N$=200, then $$\frac{1}{T_1} = \frac{1}{T_3} = 40 \text{ radians per second}$$

Another restraint for critical damping is that $H_2T_2$ be selected so that $G_2H_2T_2$ is approximately equal to $\dfrac{(G_2G_1H_1)^{3/2}}{2\omega_N}$ The resulting gain of the rate loop, less the filter 14, is shown by the line 24 in FIG. 2. The transfer characteristic of the filter has been separately depicted in this FIG., and the loop gain of the complete rate loop (including filter) is a composite of filter) line 24 and the filter characteristic. It is therefore apparent that the regulator's dynamic response to source or load disturbances will be dominated by the rate loop. Critically damping the system with respect to such power disturbances ordinarily results in an overdamped response to step changes of the reference signal. In some applications of my invention it may be desirable to overdamp the system by making $H_2T_2$ higher than the value at which critical damping obtains, in which event the deviation of $V_o$ in response to abrupt load changes will be longer lasting but of lesser magnitude.

My invention can be implemented with any suitable circuit details well known to those skilled in the art, and for purposes of illustration, the details of one particular embodiment of the stabilizing network 20 and the rate feedback means 21 have been shown in FIG. 3. As can be seen in this FIG., the difference between the given reference signal $V_R$ and the proportional feedback signal $H_1V_u$ is applied to the input terminals 20a, 20b of a lag network that comprises a parallel capacitor 30 between two pairs of series resistors 31 and 32. If desired, the capacitor 30 could be shunted by a clamp or bound circuit (not shown) to limit its maximum charge. The resulting error signal is a current $i_e$ whose magnitude is substantially proportional to $V_R-H_1V_u$ at frequencies under the characteristic break frequency of the lag network. To derive the rate feedback signal, the output voltage $V_o$ of the power conversion apparatus is applied to the input terminals 21a, 21b of a differentiating network comprising resistors 33, 34, 35, and 36 and a transformer 37 which components are interconnected and arranged as shown. The primary and secondary windings of the transformer 37 are closely coupled on a magnetizable core having an air gap. The resulting rate feedback signal is a current $i_f$ whose magnitude is substantially proportional to the rate of change of $V_o$ at frequencies under the characteristic break frequency of the rate feedback means.

The error signal $i_e$ and the rate feedback signal $i_f$ are fed in opposite directions to a pair of summation points 22a and 22b, and their difference comprises the control signal $i_c$ which is supplied to a control signal amplifier represented in FIG. 3 by a resistor 15a. The resistance of 15a will be very much smaller than the resistance of resistor 31 or 33. As previously explained, the magnitude of the control signal $i_c$ will determine the average magnitude of the converter output voltage $V_u$. Commonly the latter is essentially zero when $i_c$=0; it can reverse polarity and become negative if the direction of $i_c$ reverses from that indicated in FIG. 3.

While I have shown and described a preferred form of my invention by way of illustration, other modifications will probably occur to those skilled in the art. I therefore contemplate by the concluding part of this specification to cover all such modifications as fall within the true spirit and scope of my invention.

I claim:

1. In combination:
   a. electric power conversion apparatus comprising controlled rectifying means serially connected via a filter to a DC bus which in turn is adapted to be connected to an electric power load,
      i. said rectifying means being adapted to be connected to an electric power source and being operative to energize said filter with an undulating voltage whose average magnitude depends on the magnitude of a variable control signal supplied to the rectifying means,
      ii. said filter having series inductance and parallel capacitance elements of appropriate values to attenuate the ripple in said undulating voltage, whereby a relatively smooth unipolarity output voltage is applied to said DC bus;
   b. a first voltage regulating loop comprising proportional feedback means for deriving a first feedback signal from said undulating voltage and means for providing an error signal representing the magnitude difference between a given reference signal and said first feedback signal; and
   c. a second voltage regulating loop comprising rate feedback means connected to said DC bus for deriving a second feedback signal from said output voltage and means for supplying said rectifying means with a control signal whose magnitude depends on the difference between said error signal and said second feedback signal.

2. The combination of claim 1 in which said first voltage regulating loop includes stabilizing means for attenuating the ripple content of said first feedback signal.

3. The combination of claim 1 in which the second loop has a loop gain that dominates that of said first loop at frequencies in the vicinity of the resonant frequency of said filter, whereby said second feedback signal overrides said error signal during power disturbances.

4. The combination of claim 2 in which the parameters of said stabilizing means and of said rate feedback means are selected to critically damp the response of said apparatus to no-load power disturbances.

5. The combination of claim 4 in which said rate feedback means is so constructed and arranged that its dynamic transfer characteristic is the same as or higher than approximately $$\frac{(G_2 G_1 H_1)^{3/2}}{G_2 2\omega_N}$$

and its time constant is approximately equal to the time constant of said stabilizing means.

6. The combination of claim 5 in which said stabilizing means has a time constant approximately equal to $$\frac{(G_2 G_1 H_1)^{1/2}}{2\omega_N}$$

UNITED STATES PATENT OFFICE
CERTIFICATE OF CORRECTION

Patent No. 3,577,059  Dated May 4, 1971

Inventor(s) Fred W. Kelley, Jr.

It is certified that error appears in the above-identified patent and that said Letters Patent are hereby corrected as shown below:

Column 2, line 61 - after FIG. 1a, insert -- the filter 14 --

Signed and sealed this 10th day of August 1971.

(SEAL)
Attest:

EDWARD M. FLETCHER, JR.
Attesting Officer

WILLIAM E. SCHUYLER, J.
Commissioner of Patent